G. M. KITZMILLER.
MAIL DISTRIBUTOR.
APPLICATION FILED JULY 12, 1921.
1,425,387.
Patented Aug. 8, 1922.
11 SHEETS—SHEET 7.
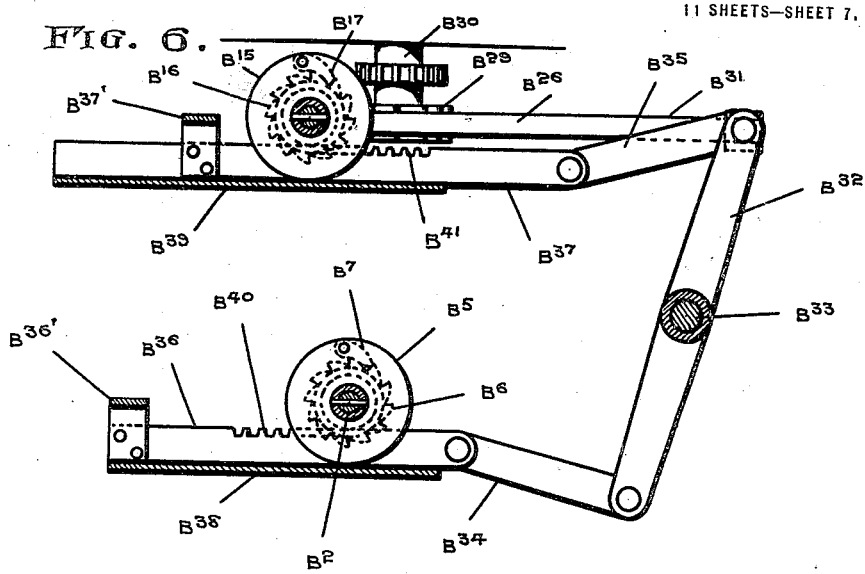
FIG. 6.
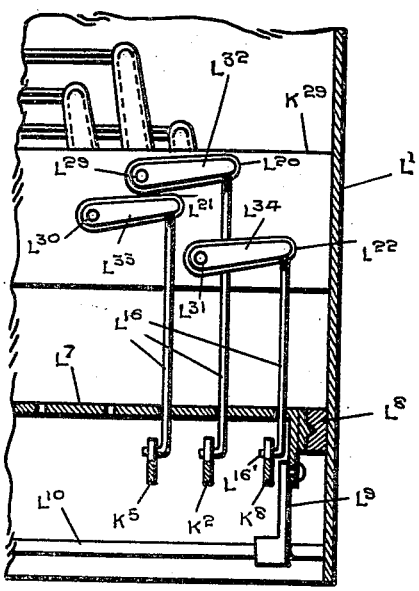
FIG. 7.                    FIG. 8.
INVENTOR
George M. Kitzmiller
Ogle R. Singleton
ATTORNEY

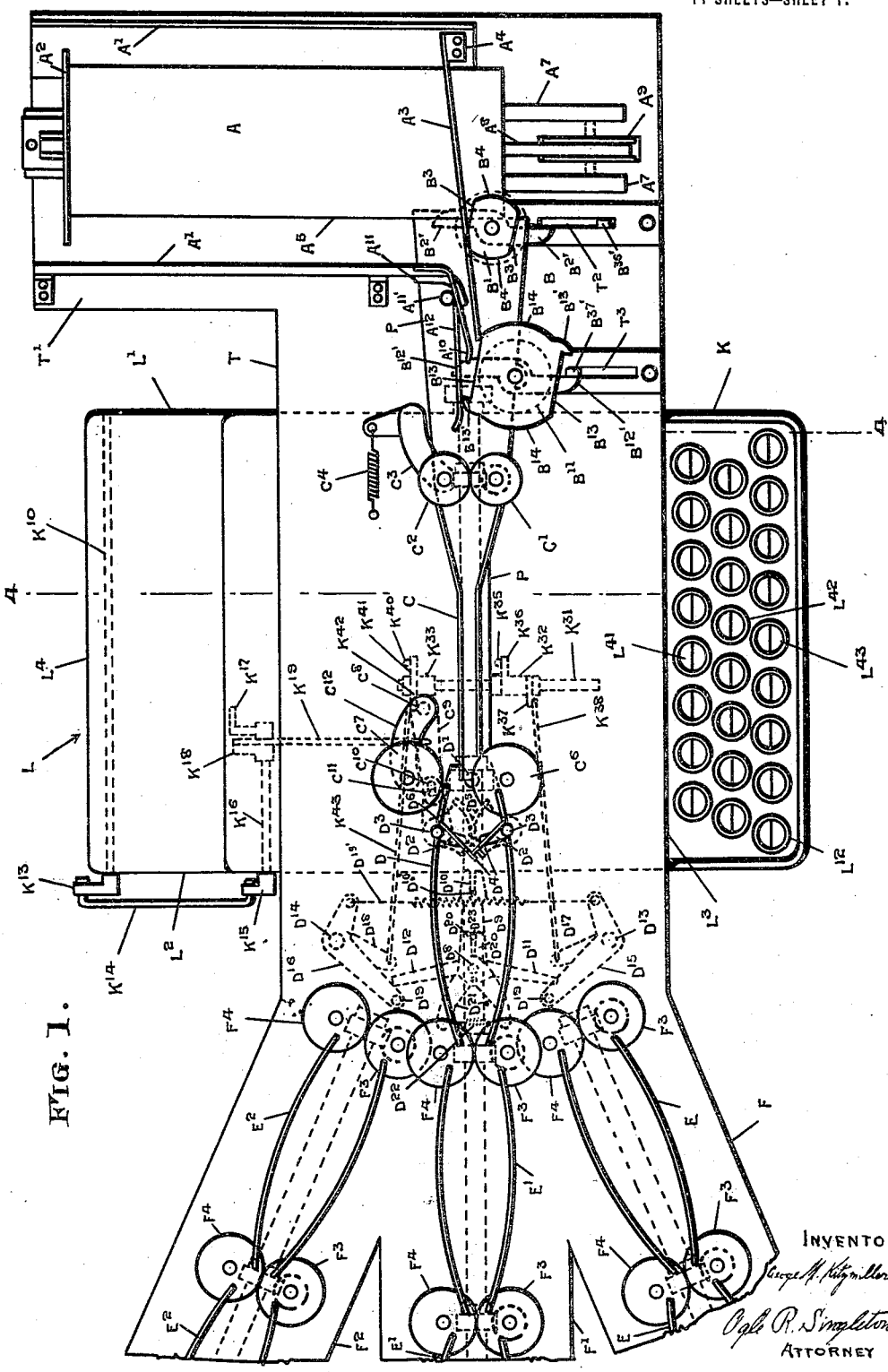

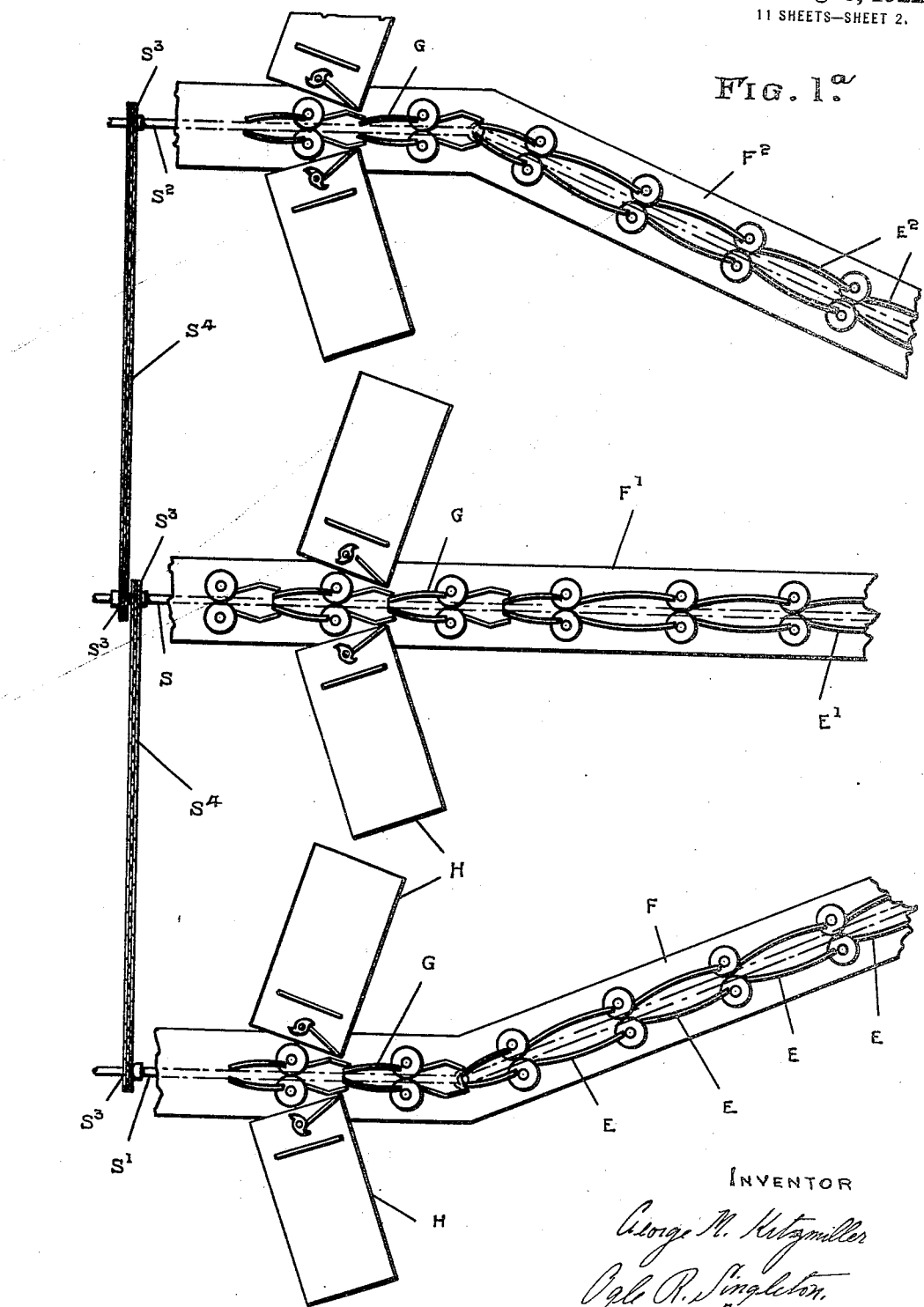

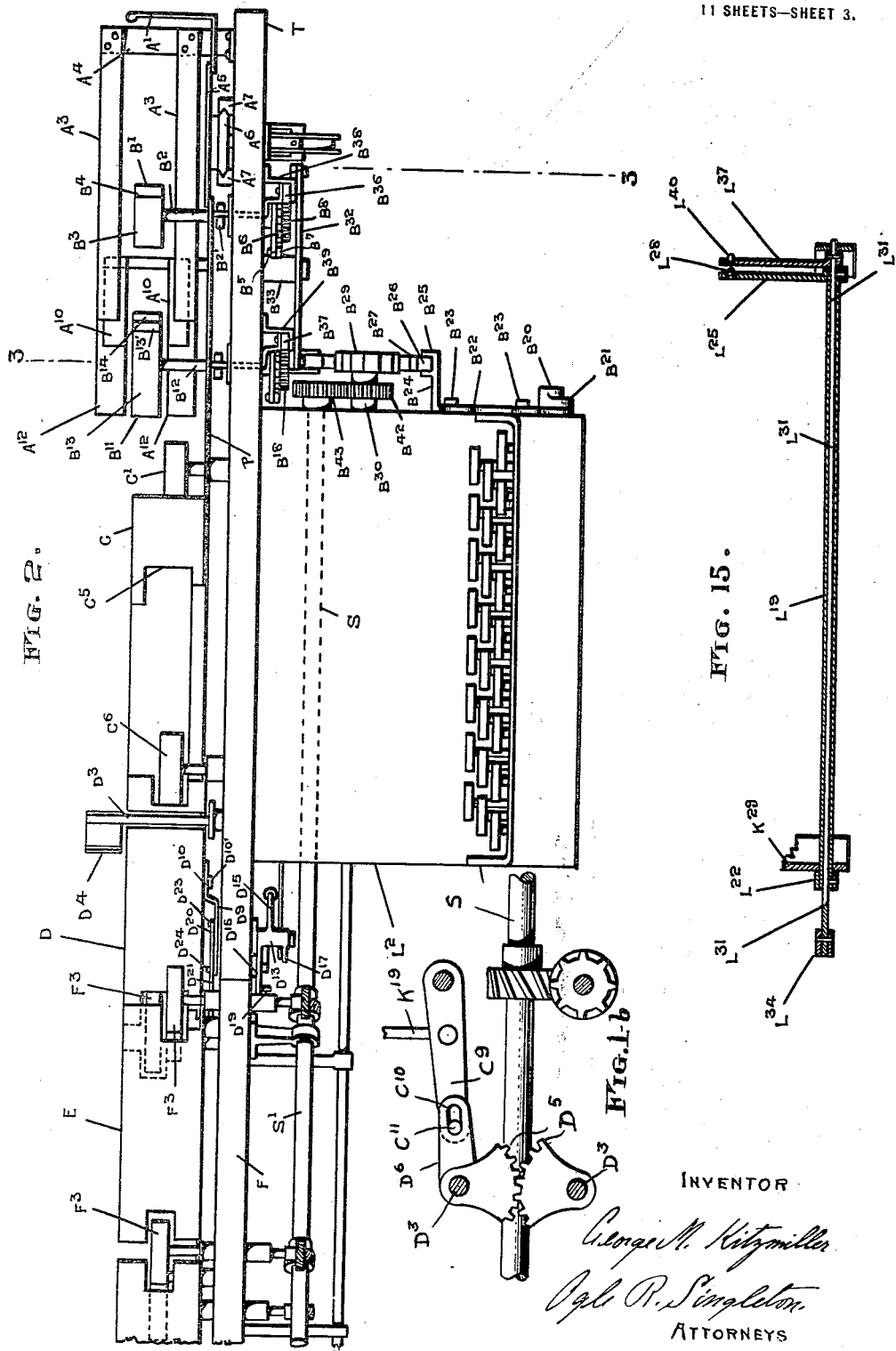

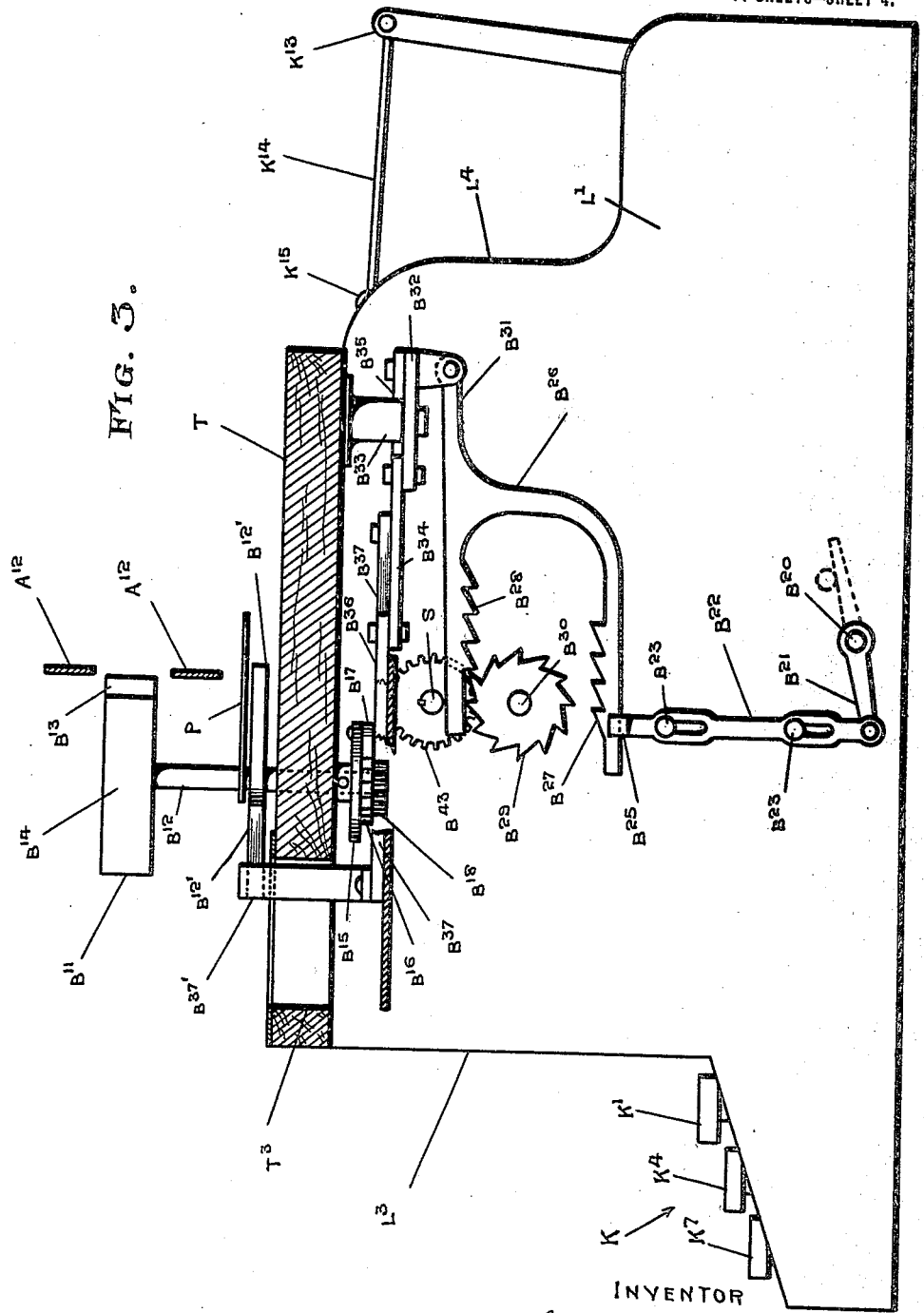

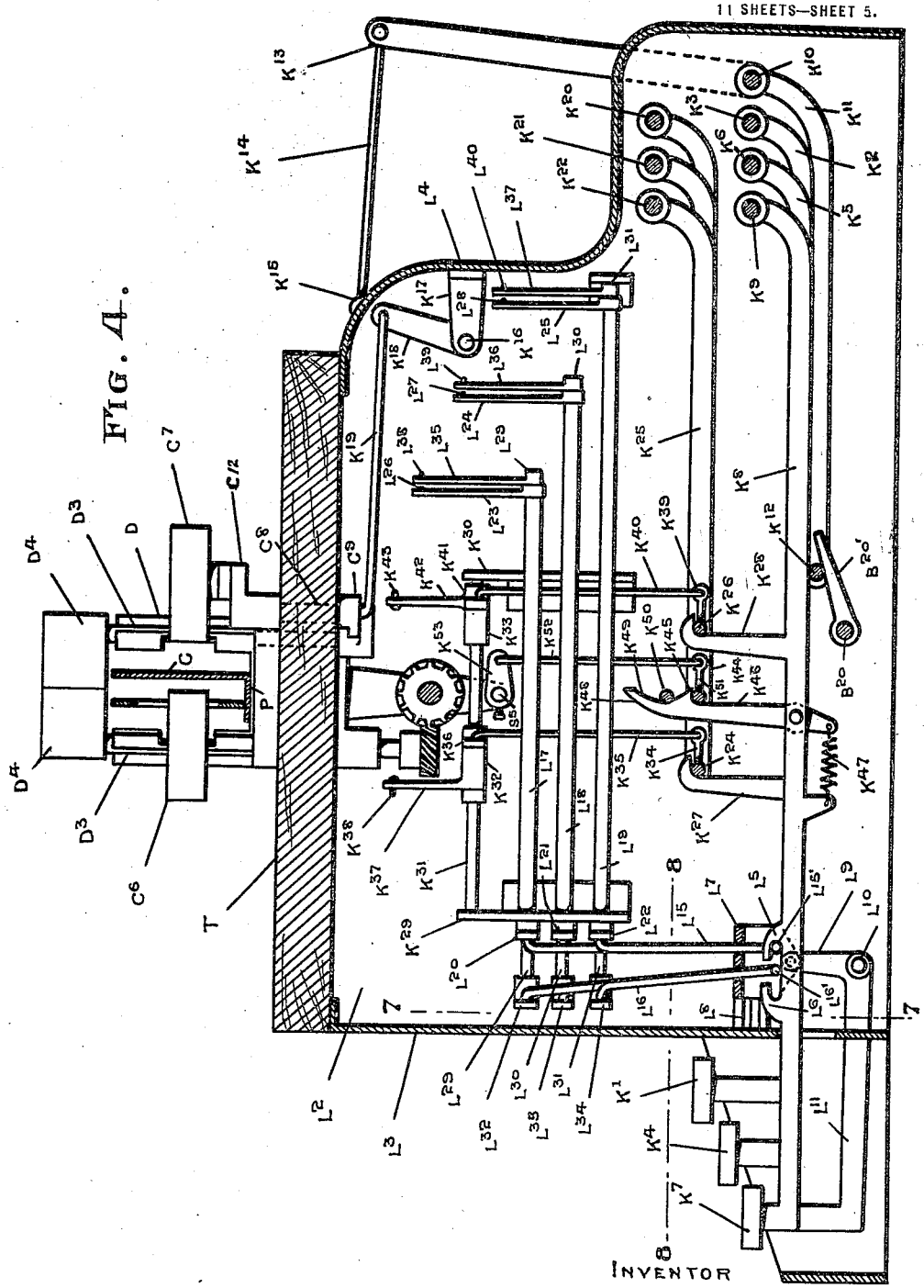

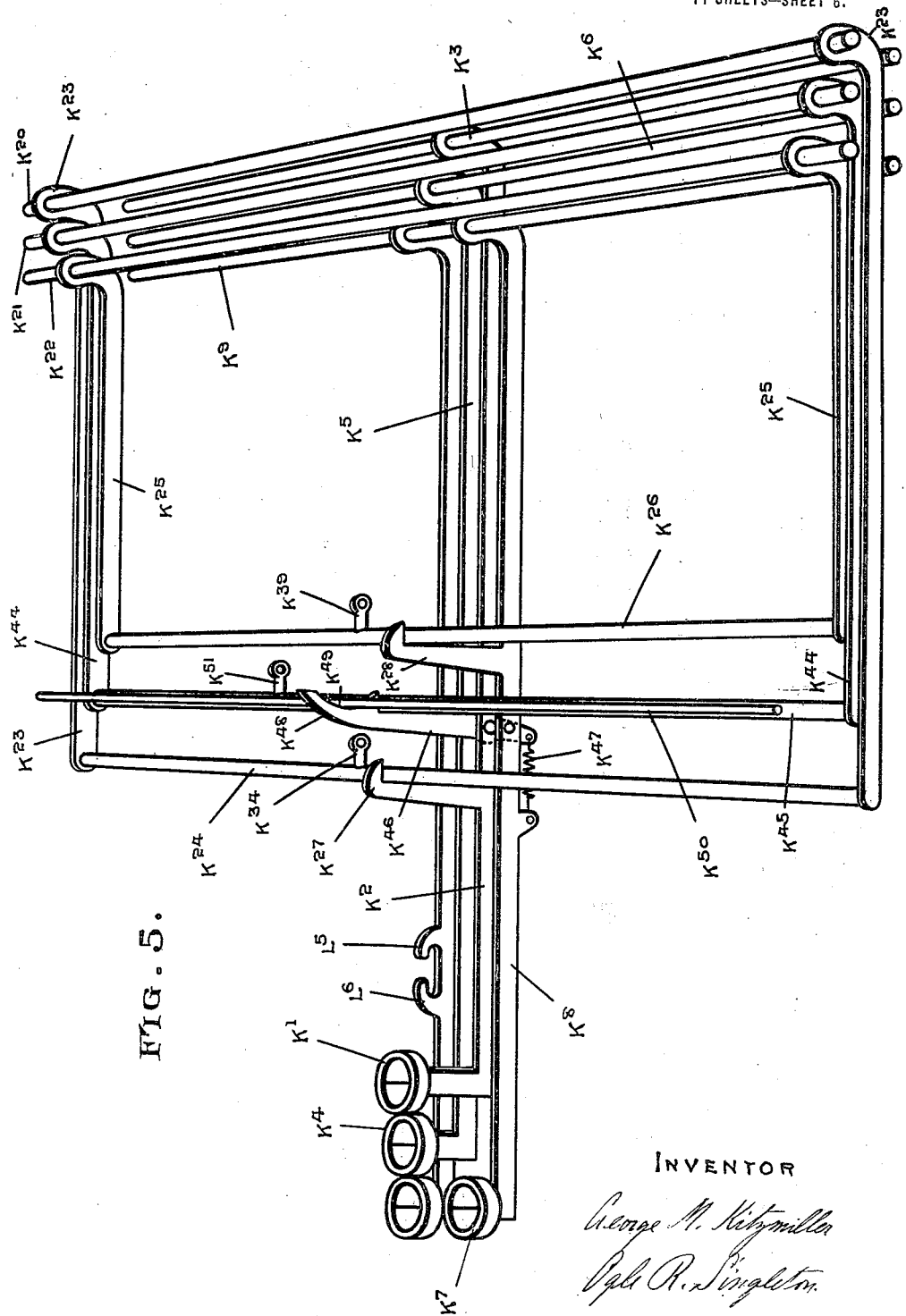

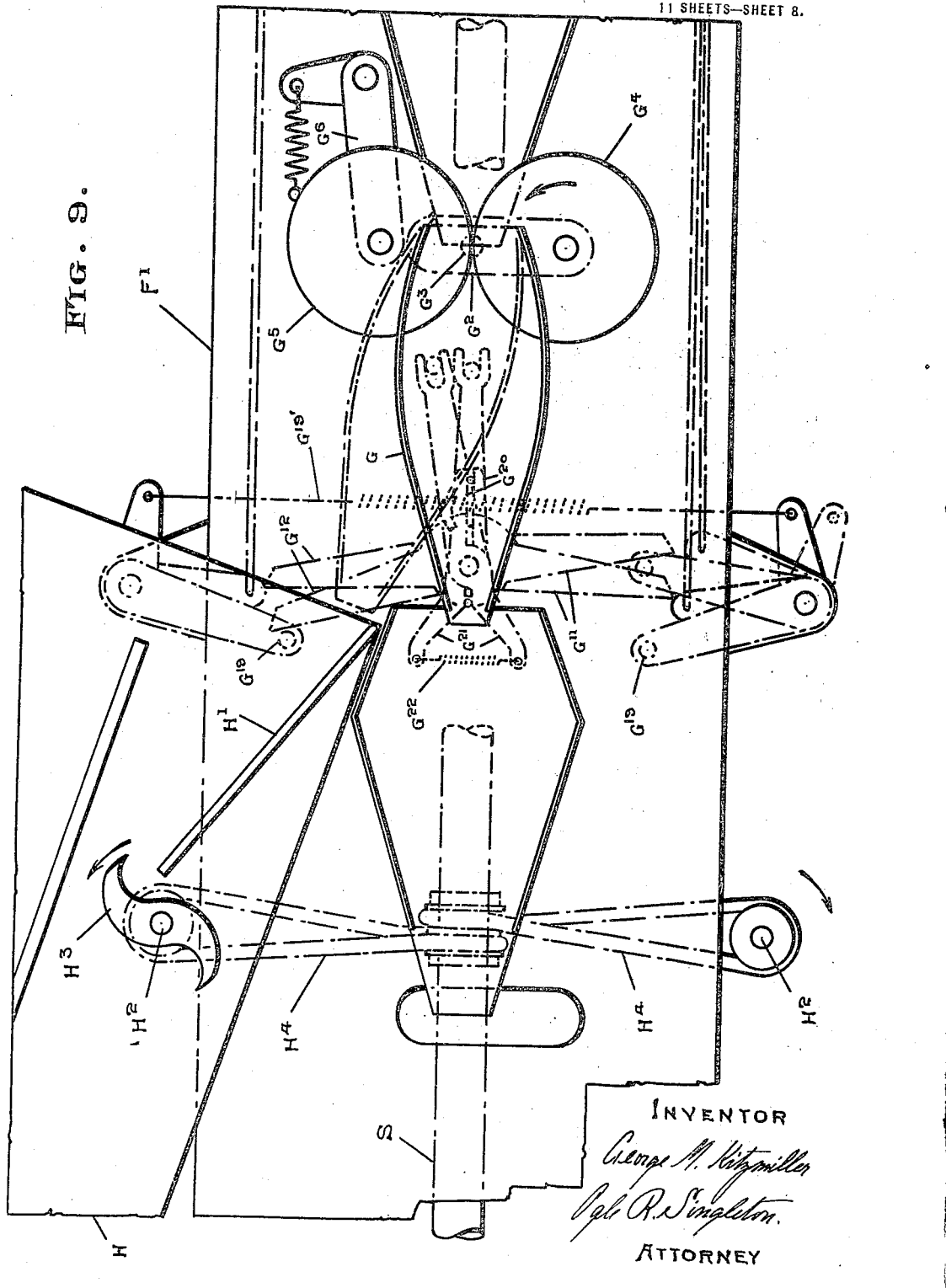

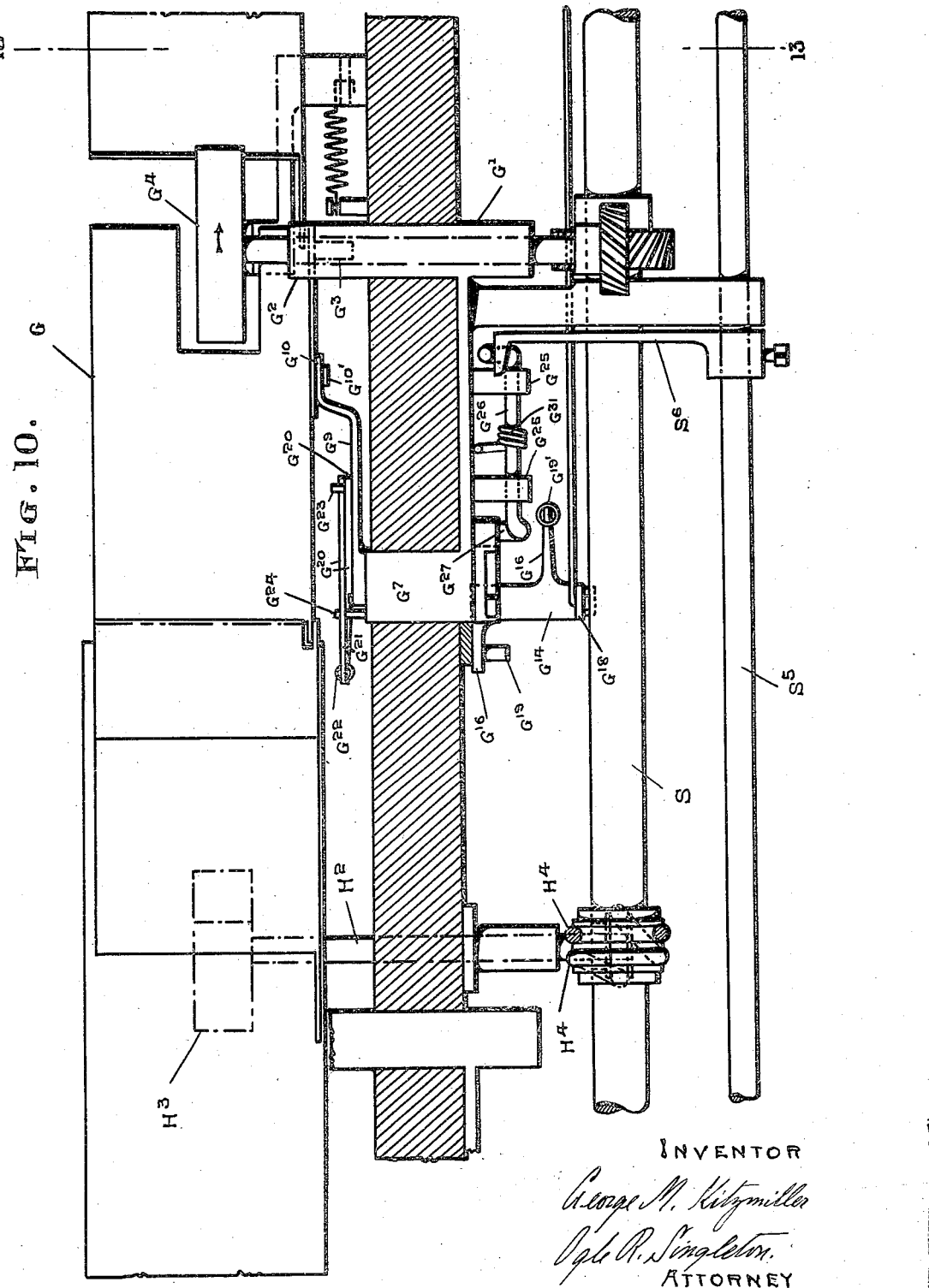

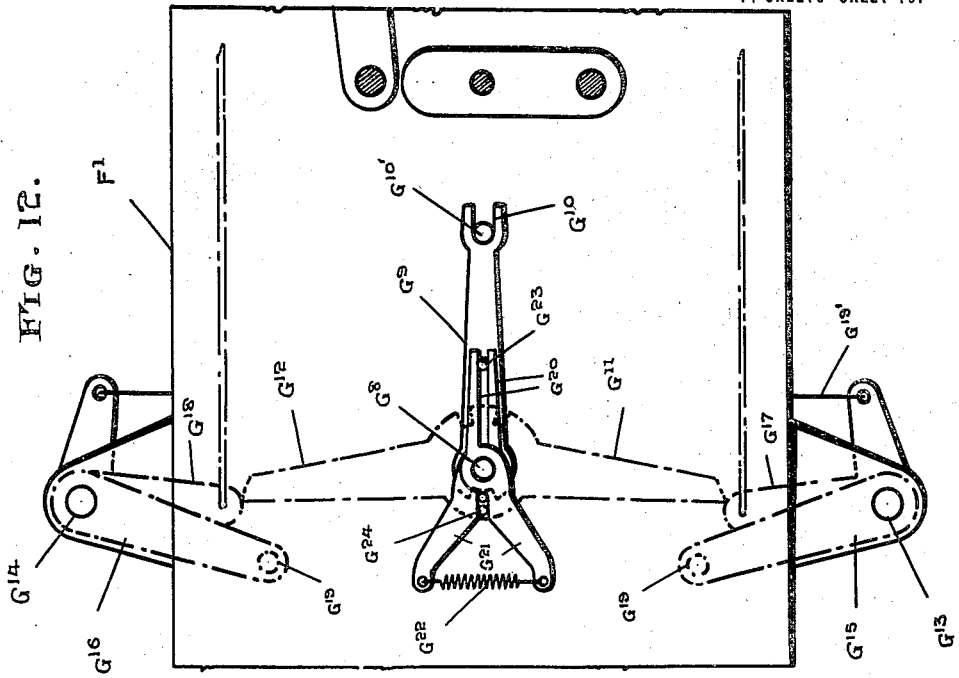
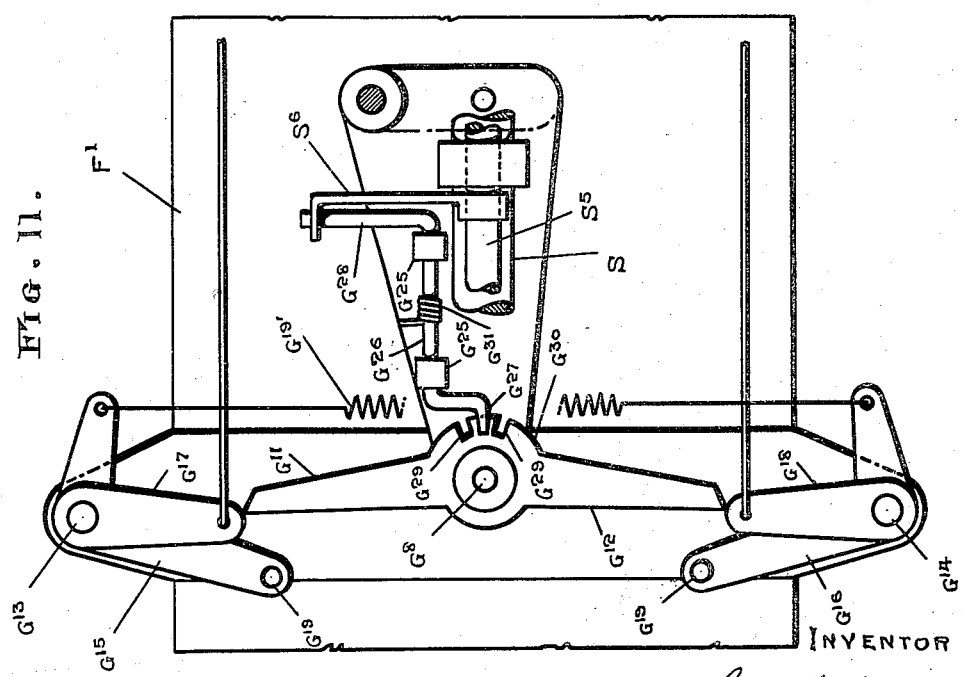

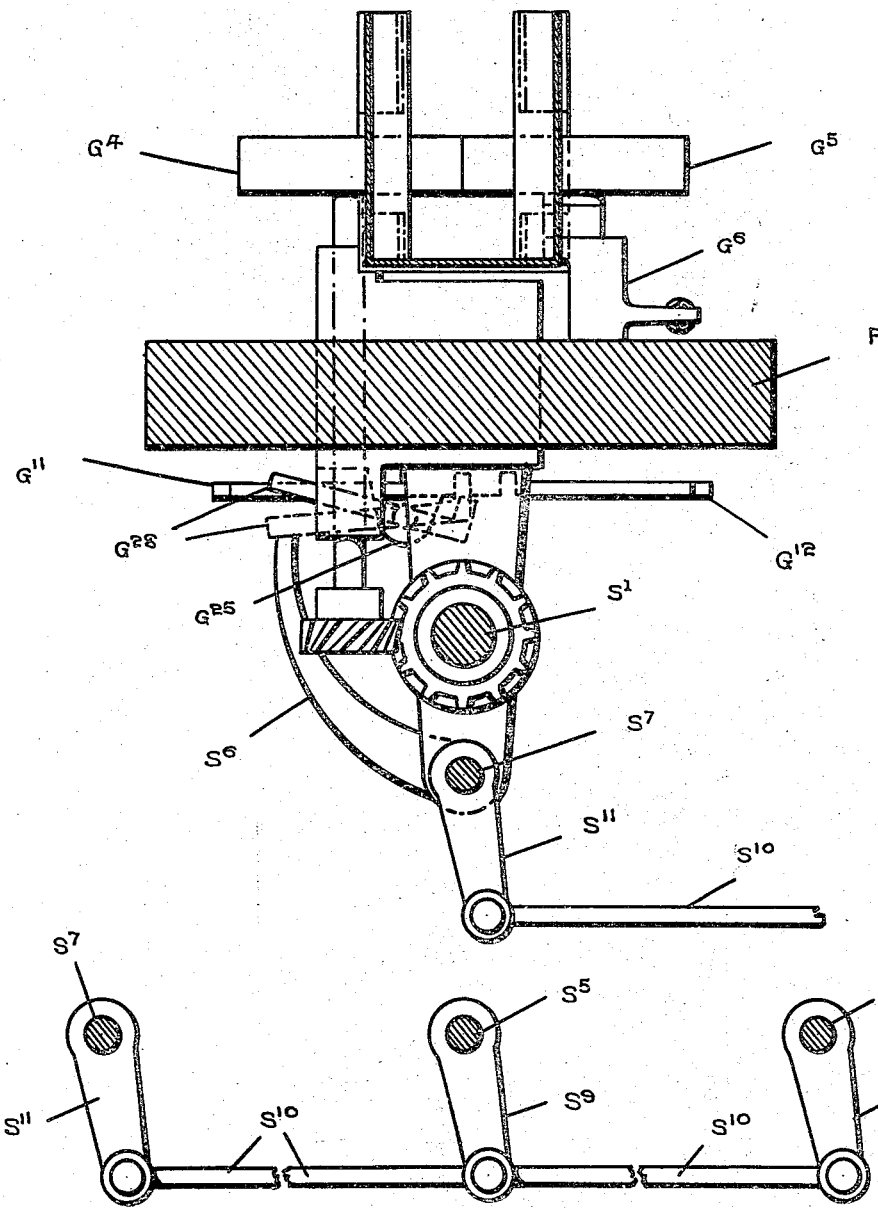

UNITED STATES PATENT OFFICE.

GEORGE M. KITZMILLER, OF NORFOLK, VIRGINIA, ASSIGNOR OF ONE-HALF TO LOUIS LARSON, OF NORFOLK, VIRGINIA.

MAIL DISTRIBUTOR.

1,425,387.  Specification of Letters Patent.  Patented Aug. 8, 1922.

Application filed July 12, 1921. Serial No. 484,080.

*To all whom it may concern:*

Be it known that I, GEORGE M. KITZMILLER, a citizen of the United States, residing in the city of Norfolk, in the county of Norfolk and State of Virginia, have invented certain new and useful Improvements in Mail Distributors, of which the following is a specification.

My invention consists in a new and useful improvement in mail distributors and is designed to provide a device for the distribution of mail whose operation is entirely mechanical, obviating the use of electricity or compressed air for sorting the letters. My device is intended for use wherever large quantities of mail are handled, such as in post offices, postal cars and large public or private establishments handling mail in considerable quantities.

It is intended to replace the present method of sorting mail by hand and affords a means for separating unassorted mail matter into the desired boxes, bags or receptacles with considerably greater speed than is possible by hand sorting.

In my device the unassorted mail is placed in a single receptacle, and each letter is fed separately to a view point where the operator may read the address and, by pressing a key, cause the letter to be fed into its appropriate box.

One of the particularly valuable features of my device is the control of all the operative parts entirely by means of the keys conveniently placed upon the key board immediately before the operator, and the fact that each letter is caused to travel in an upright position, sliding on its bottom edge, on a continuous track, from the unassorted mail receptacle to its appropriate sorting box.

My device can be constructed to provide any desired number of sorting boxes as the occasion may require, as the principle of the invention is capable of being embodied in a variety of forms and, while I have illustrated in the drawings filed herewith details of construction hereinafter fully described indicating one specific embodiment of my invention, it is to be understood that my invention is not limited to said details of construction and I refer for its scope to the claims appended hereto.

In the drawings:

Fig. 1 is a top plan view of the distributing mechanism.

Fig. 1ª is a top plan view showing the arrangement of the mail receiving boxes.

Fig. 1ᵇ is a top plan view of a detail of the distributing mechanism.

Fig. 2 is a front elevation of the portion of the device shown in Fig. 1.

Fig. 3 is an end elevation partly in section on the line 3—3 of Fig. 2.

Fig. 4 is a vertical section on the line 4—4 of Fig. 1.

Fig. 5 is a perspective view of certain parts of the operative mechanism.

Fig. 6 is a horizontal section of a portion of the selecting mechanism.

Fig. 7 is a vertical section on line 7—7 of Fig. 4.

Fig. 8 is a horizontal section on line 8—8 of Fig. 4.

Fig. 9 is a top plan view of a portion of the distributing mechanism.

Fig. 10 is a front elevation partly in section of the portion shown in Fig. 9.

Fig. 11 is a bottom plan view of a detail.

Fig. 12 is a top plan view of a detail.

Fig. 13 is a vertical transverse section of a portion of the distributing mechanism.

Fig. 14 is an end elevation of a detail.

Fig. 15 is a vertical elevation of a detail.

In the particular embodiment of my invention illustrated in the drawings the device is mounted upon a suitable table T of wood or other desired material. This table T may be supported in any desired manner so as to dispose the device at a suitable height for ease of operation, the operator being seated or standing. The side of the device toward the operator will be referred to as the "front" and the terms "right" and "left" as applied to the device will indicate the right and left of the operator as he faces the device.

The controlling mechanism of the device is comprised in a key board K which is situated somewhat below the table T and toward its right end.

The unassorted mail matter is placed in the device in the receptacle A upon the table T at its extreme right end.

Each individual piece of mail matter is fed from the receptacle A by the selector B to the trough C where the address may be ascertained.

The device illustrated is designed to provide forty-two individual receptacles to receive the mail sorted by the device.

To the left of the key board K the table T is trifurcate thus providing support for three groups of assorted mail receptacles H. Each group has two sets of seven receptacles H.

To the left of the trough C is located the master deflector D which is a swingable trough adapted to direct each piece of mail from the trough C to one of the troughs E, $E^1$, $E^2$ which are on the channels F, $F^1$, $F^2$ respectively to direct the mail matter to each of the three groups of receptacles H respectively. Each group has a channel for the mail between its two sets of receptacles H formed by the individual deflectors G by which the mail is conducted to the particular receptacle H into which it is to be deposited.

It is to be noted that by reason of the fact that the individual deflectors G are situated between the two sets of receptacles H each deflector G can serve to deflect mail into a receptacle H in either set.

To control the delivery of mail to these receptacles H, I have provided twenty-one keys upon the key board K since, by the use of a shift-key, each key may cause its related deflector G to deflect mail into either of two receptacles H.

The unassorted mail matter receptacle A is rectangular and of greater length than width extending over and supported on an L $T^1$ of the table T. The receptacle A is formed by side walls $A^1$, $A^1$, a rear wall $A^2$ and two front bars $A^3$, $A^3$ which are mounted on a post $A^4$ upon the table T. In the bottom of the receptacle A there is a movable platform $A^5$ to which the rear wall $A^2$ is attached. This platform $A^5$ is mounted on a slide $A^6$ guided between rails $A^7$, $A^7$. Fastened to this slide $A^6$ is a flexible band $A^8$ carried over a spring roller $A^9$ which is hung from the under side of the table T. This roller $A^9$ is provided with any desired mechanism for causing the band $A^8$ to be coiled upon the roller $A^9$ thus drawing the platform $A^5$ forwardly of the receptacle A.

The side wall $A^1$ upon the left side of the receptacle A is provided with two flexible fingers $A^{10}$, $A^{10}$ which extend to the left of the wall $A^1$ and are in line horizontally with the front bars $A^3$, $A^3$ and extend toward same. The relation of the bars $A^3$, $A^3$ and $A^{10}$, $A^{10}$ thus forms a guideway for the pieces of mail matter fed from the front end of the receptacle A. A flexible rubber plate $A^{11}$ is attached to the side wall $A^1$ between the bars $A^{10}$, $A^{10}$ and extending slightly into this guideway.

A polished metal base plate P mounted on the table T extends from the movable platform $A^5$ toward the left, under the guideway above referred to and the selector B and trough C, thus affording a smooth surface upon which the pieces of mail matter may slide upon their lower edges when being forwarded by the selector B from the receptacle A to the trough C.

The selector B contains two alternately operating forwarding mechanisms which are referred to as the "initial selector" and the "secondary selector." The initial selector is designed to remove a single piece of mail matter from the receptacle A and deliver same through the guideway formed by the bars $A^3$, $A^3$ and $A^{10}$, $A^{10}$, to the secondary selector. The secondary selector takes the piece so delivered and delivers it into the trough C where the address may be ascertained.

The initial selector comprises a rotatable cam $B^1$ fixedly mounted upon a shaft $B^2$ which passes through the plate P and is journaled in the table T immediately to the left of the platform $A^5$ and in front of the bars $A^3$, $A^3$. The cam $B^1$ is located in a horizontal plane midway between the planes of the bars $A^3$, $A^3$. The cam $B^1$ is provided with two rectilinear faces $B^3$, $B^3$ and two intermediate curved faces $B^4$, $B^4$. Fixed on the shaft $B^2$ immediately below the table T is a disc $B^5$ and below this disc $B^5$, loosely surrounding the shaft $B^2$, is a ratchet $B^6$. A dog $B^7$ carried upon the disc $B^5$ co-acts with the ratchet $B^6$. To the underside of the ratchet $B^6$ is fixed a gear $B^8$ the driving means for which will be presently described.

The secondary selector comprises a rotatable cam $B^{11}$ fixedly mounted upon a shaft $B^{12}$ which passes through the front edge of the plate P and is journaled in the table T immediately to the left of the guideway formed by the rods $A^3$, $A^3$ and $A^{10}$, $A^{10}$. The cam $B^{11}$ is in line horizontally with the cam $B^1$ and is also provided with two rectilinear faces $B^{13}$, $B^{13}$ and two intermediate curved faces $B^{14}$, $B^{14}$. Each rectilinear face $B^{13}$ is provided with an outwardly extending projection $B^{13'}$. Immediately behind the bars $A^{10}$, $A^{10}$, there is located the post $A^{11'}$ on which are mounted the spring fingers $A^{12}$, $A^{12}$ which extend to the left of the post $A^{11'}$ and form a guideway to the left of the rods $A^{10}$, $A^{10}$ to guide the mail matter to the cam $B^{11}$. Fixed on the shaft $B^{12}$ immediately below the table T is a disc $B^{15}$, and below the disc $B^{15}$, loosely surrounding the shaft $B^{12}$, is a ratchet $B^{16}$. A dog $B^{17}$ carried upon the disc $B^{15}$ co-acts with the ratchet $B^{16}$. To the under side of the ratchet $B^{16}$ is fixed a gear $B^{18}$.

The driving means for the gears $B^8$ and $B^{18}$ will now be described:

Depending from the table T beneath the trough C is the casing L which contains the key board K and its associated mechanisms for controlling the device. Journaled in the sides of this casing L is the rock shaft $B^{20}$ which extends through the right side $L^1$ of the casing L and carries upon its end outside of the casing L the crank $B^{21}$ which is pivotally connected with the slide $B^{22}$ held in position for vertical sliding movement against the side $L^1$ by pins $B^{23}$, $B^{23}$. This slide $B^{22}$ is provided at its upper end with a right-angularly disposed extension $B^{24}$ having a fork $B^{25}$. Slidably supported in this fork $B^{25}$ is the yoke $B^{26}$ provided upon its lower and upper inner faces respectively with the racks $B^{27}$ and $B^{28}$. Located between said racks is the pinion $B^{29}$ mounted upon the stub-shaft $B^{30}$ suitably journaled in the side $L^1$ of the casing L. The yoke $B^{26}$ is provided with a rearwardly extending portion $B^{31}$ connected with one end of a working beam $B^{32}$ suitably pivoted upon the post $B^{33}$ depending from the table T. This beam $B^{32}$ is connected by means of links $B^{34}$ and $B^{35}$ with slides $B^{36}$ and $B^{37}$ respectively which are slidably supported in guides $B^{38}$ and $B^{39}$ respectively, depending from the table T. These slides $B^{36}$ and $B^{37}$ are provided with racks $B^{40}$ and $B^{41}$ respectively adapted to mesh with the gears $B^8$ and $B^{18}$ respectively and drive said gears when said racks are reciprocated.

The stub-shaft $B^{30}$ is provided with a gear $B^{42}$ which meshes with a gear $B^{43}$ keyed upon the end of the shaft S which extends through the casing L and is suitably journaled under the table T. This shaft S is suitably connected with a prime mover and serves to furnish power for operating the various mail forwarding mechanisms in the device.

Fixed upon the shaft $B^2$ of the primary selector at a point between the cam $B^1$ and the table T are two oppositely extending fingers $B^{2\prime}$, $B^{2\prime}$. The slide $B^{36}$ is provided at its forward end with an upstanding extension $B^{36\prime}$ which projects through a slot $T^2$ in the table T.

Fixed upon the shaft $B^{12}$ of the secondary selector at a point between the cam $B^{11}$ and the table T are two oppositely extending fingers $B^{12\prime}$, $B^{12\prime}$. The slide $B^{37}$ is provided at its forward end with an upstanding extension $B^{37\prime}$ which projects through a slot $T^3$ in the table T.

These fingers and co-acting extensions upon the slides serve to limit the movement of the cams to a one-half revolution at each operation.

Located to the left of the secondary selector at the mouth of the trough C are the forwarding rollers $C^1$, $C^2$ so situated as to be adapted to take each piece of mail matter as it is presented to them by the secondary selector and forward it through the trough C. The roller $C^1$ is journaled in the table T and driven by any suitable connection with the power shaft S. The roller $C^2$ is an idler and is journaled on a crank arm $C^3$ pivotally mounted upon the table T and pressed by the spring $C^4$ so as to hold the roller $C^2$ in yielding contact with the roller $C^1$. The trough C is provided in its front wall with a cut-away portion $C^5$ which affords a view point where the address upon each piece of mail matter may be ascertained. This view point is directly above and slightly to the rear of the middle of the key board K.

Located to the left of the trough C are the forwarding rollers $C^6$ and $C^7$. The roller $C^6$ is journaled in the table T and is driven by any suitable connection with the power shaft S. The roller $C^7$ is an idler and its mounting will be presently described.

The swingable trough D, called the "master deflector", is mounted upon a shaft $D^1$ which is suitably journaled in the table T between the rollers $C^6$ and $C^7$. The bottom of the trough D is provided with curved slots $D^2$, $D^2$ through which pass the shafts $D^3$, $D^3$ which are suitably journaled in the table T and upon which are mounted the gates $D^4$, $D^4$. Each piece of mail matter when forwarded into the trough C is restrained therein by the gates $D^4$, $D^4$, while its address is ascertained by the operator. Upon the shafts $D^3$, $D^3$ between the bottom of the trough D and the table T are mounted the intermeshing segmental gears $D^5$, $D^5$. Upon the shaft $D^3$ adjacent the roller $C^7$ is mounted the crank arm $D^6$. Suitably journaled in the table T immediately behind the trough C is the rock shaft $C^8$ upon which is the crank arm $C^9$ which has a slot $C^{10}$ in which is a pin $C^{11}$ upon the crank arm $D^6$. Also mounted upon the rock shaft $C^8$ is a crank arm $C^{12}$ upon which is rotatably mounted the idler $C^7$. The means for moving the crank arm $C^9$ and, through the slot and pin connection, the arm $D^6$, and thus opening and closing the gates $D^4$, $D^4$, and, at the same time through the arm $C^{12}$ bringing the roller $C^7$ into and out of contact with the roller $C^6$, will be presently described.

The means for moving the swingable trough D out of its normal position in line with trough $E^1$, so that it shall be in line with either trough E or $E^2$ is as follows:

A rock shaft $D^8$ is journaled in the table T below the trough D and upon it is fixed a crank arm $D^9$ having a fork $D^{10}$ which embraces a pin $D^{10\prime}$ upon the bottom of the trough D. Thus the rocking of the shaft $D^8$ will cause the trough D to move on its shaft $D^1$. The shaft $D^8$ is provided at a point below the table T with two crank arms $D^{11}$ and $D^{12}$ which extend outwardly on opposite sides of the shaft $D^8$. Suitably journaled in the under side of the table T are two rock shaft $D^{13}$ and $D^{14}$ upon which are mounted bell-crank levers $D^{15}$ and $D^{16}$ respectively and crank arms $D^{17}$ and $D^{18}$ respectively. In the ends of the bell-crank levers $D^{15}$ and $D^{16}$ adjacent the crank arms $D^{11}$ and $D^{12}$ are depending pins $D^{19}$. The opposite ends of the bell crank levers $D^{15}$ and $D^{16}$ are connected by a coil spring $D^{19'}$. The means for moving the two crank arms $D^{17}$ and $D^{18}$ and thus, through the bell-crank levers $D^{15}$ and $D^{16}$, their pins $D^{19}$ and the crank arms $D^{11}$ and $D^{12}$, moving the trough D will be presently described.

Loosely mounted upon the shaft $D^8$ on top of the crank arm $D^9$ are the return levers $D^{20}$, $D^{20}$ provided with crank arms $D^{21}$, $D^{21}$ connected by a coil spring $D^{22}$. These return levers bear against a pin $D^{23}$ projecting upwardly from the crank arm $D^9$. The crank arms $D^{21}$, $D^{21}$ bear against a pin $D^{24}$ fixed in the table T adjacent the shaft $D^8$. These return levers and crank arms are related scissorwise. The movement of the crank arm $D^9$ moving the trough D, causes one of the return levers $D^{20}$ to move, thus moving its associated crank arm $D^{21}$ and distending the spring $D^{22}$, since the other crank arm $D^{21}$ is held immovable by the pin $D^{24}$. When the actuating means for moving the trough D has been relieved from power, the pressure exerted by the spring $D^{22}$ causes the trough D to return to normal position.

Each of the troughs E, $E^1$ and $E^2$ on the channels F, $F^1$ and $F^2$ is provided at its right end with a pair of forwarding rollers $F^3$ and $F^4$. The rollers $F^3$ are suitably journaled in the table T, and those on the channel $F^1$ are driven by the power shaft S. Those on channel F are driven by a counter shaft $S^1$ and those on channel $F^2$ by a counter shaft $S^2$. These counter shafts $S^1$ and $S^2$ are suitably journaled beneath the channels F and $F^2$ respectively and are driven by any suitable means as by sprockets $S^3$ and chains $S^4$ connected with the power shaft S. The rollers $F^4$ are idlers and are mounted in a manner similar to the roller $C^2$.

The individual deflectors G are of substantially the same form as the master deflector D, only of somewhat less length.

For each of the deflectors G, I provide a supporting frame $G^1$ which is suitably mounted in the table T. This frame $G^1$ provides a plate $G^2$ in which is journaled the shaft $G^3$ upon which is mounted the deflector G. In this plate $G^2$ is journaled the forwarding roller $G^4$ which is suitably connected with the power shaft. Associated with this roller $G^4$ is a spring pressed idler $G^5$ mounted on a crank arm $G^6$ pivotally mounted on the table T. The frame $G^1$ affords a journal $G^7$ for a rock shaft $G^8$ having a crank arm $G^9$ with a fork $G^{10}$ embracing a pin $G^{10'}$ fixed in the bottom of the deflector G. The shaft $G^8$ is provided below the journal $G^7$ with two crank arms $G^{11}$ and $G^{12}$. Suitably journaled on the under side of the table T are two rock shafts $G^{13}$ and $G^{14}$ upon which are mounted bell-crank levers $G^{15}$ and $G^{16}$ and crank arms $G^{17}$ and $G^{18}$. In the ends of the bell-crank levers $G^{15}$ and $G^{16}$ adjacent the crank arms $G^{11}$ and $G^{12}$ are depending pins $G^{19}$. The opposite ends of the levers $G^{15}$, $G^{16}$ are connected by a coil spring $G^{19'}$. The means for moving the two crank arms $G^{17}$, $G^{18}$ and thus, through the bell-crank levers $G^{15}$, $G^{16}$, their pins $G^{19}$ and the crank arms $G^{11}$, $G^{12}$, moving the deflector G will be presently described.

Loosely mounted upon the shaft $G^8$ on top of the crank arm $G^9$, are the return levers $G^{20}$, $G^{20}$ provided with crank arms $G^{21}$, $G^{21}$ connected by a coil spring $G^{22}$. These return levers press against a pin $G^{23}$ projecting upwardly from the crank arm $G^9$. The crank arms $G^{21}$, $G^{21}$ bear against a pin $G^{24}$ fixed in the journal $G^7$ adjacent the shaft $G^8$. These return levers operate in the same manner as the levers $D^{20}$, $D^{20}$ of the trough D already described.

I have provided locking means to retain the deflectors G in adjusted positions. The frame $G^1$ intermediate the plate $G^2$ and the journal $G^7$, is provided with two hangers $G^{25}$, $G^{25}$ in which is carried a rock shaft $G^{26}$ provided at one end with a latch $G^{27}$ and at the other with a crank arm $G^{28}$. This latch $G^{27}$ co-acts with slots $G^{29}$, $G^{29}$ in a plate $G^{30}$ fixed upon the shaft $G^8$. A spring $G^{31}$ acting upon the rock shaft $G^{26}$ causes the latch $G^{27}$ to enter one or the other of the slots $G^{29}$, $G^{29}$ when the deflector G is moved into adjusted position, thus locking the deflector G. Supported below the power shaft S is the rock shaft $S^5$ provided with fingers $S^6$ adapted to co-act with the crank arms $G^{28}$ of the locking mechanism of the deflectors G on channel $F^1$ so that the oscillation of the rock shaft $S^5$ will cause the oscillation of the rock shaft $G^{26}$ of each mechanism and withdraw the latch $G^{27}$ from the notches $G^{29}$ and permit the return levers to return the deflectors G to normal.

Rock shafts $S^7$ and $S^8$ are provided to effect the unlocking of the mechanisms of the deflectors G on the channels F and $F^2$ respectively. The rock shaft $S^5$ is provided with a crank arm $S^9$ connected by links $S^{10}$, $S^{10}$ with crank arms $S^{11}$, $S^{11}$ upon shafts $S^7$ and $S^8$ to effect the rocking of shafts $S^7$ and $S^8$ by the rocking shaft $S^5$. The means for rocking shaft $S^5$ will be presently described.

The assorted mail receptacles H are all identical in construction and a description of one of them will suffice. The receptacle H is of substantially the same construction as the receptacle A already described. It is provided at its front end, adjacent the deflector G, with a deflecting plate $H^1$ which is adapted to guide the piece of mail matter so that it will properly enter the receptacle H. Beyond this plate $H^1$ there is located a feeding device, comprising a shaft $H^2$ and a rotatable brush $H^3$ mounted thereon adapted to feed a piece of mail matter delivered to it by the plate $H^1$, into the receptacle H. The shaft $H^2$ may be driven by any suitable means, as by a band $H^4$ connected with the power shafts S, $S^1$ or $S^2$.

The casing L depending from the table T and housing the operative parts which control the device is formed by the sides $L^1$, $L^2$, and the front $L^3$ and back $L^4$. The key board K is located at the front end of the casing L. In this key board K are located the twenty-one control keys arranged in three banks of seven keys in each bank. The bank at the rear of the key board K will be referred to as "A bank," the one in the middle as "B bank," and the one at the front as "C bank." The relation of the parts is such that the keys in A bank are adapted to control the operation of the deflectors G located on the channel $F^2$ at the rear of the device, and the keys on B bank control the deflectors G on the channel $F^1$ in the middle of the device, and the keys on C bank control the deflectors G on the channel F at the front of the device.

In each bank there is located a single key known as the "repeat key," the function of which will be presently explained.

As the structure and operation of all of the keys in each bank is identical, one key in each bank with its associated mechanism will be described.

All of the keys are of the well-known form of typewriter keys, and while the keys are arranged in banks the key levers are arranged in one horizontal plane.

The key $K^1$, in A bank, has its key lever $K^2$ fulcrumed upon a rod $K^3$ passing through the casing L and supported in the sides $L^1$, $L^2$. All of the key levers of the keys in A bank are thus fulcrumed upon the rod $K^3$.

The key $K^4$, in B bank, has its key lever $K^5$ fulcrumed upon a rod $K^6$ supported in the sides $L^1$, $L^2$. All the key levers of the keys in B bank are thus fulcrumed upon the rod $K^6$.

The key $K^7$, in C bank, has its key lever $K^8$ fulcrumed upon a rod $K^9$ supported in the sides $L^1$, $L^2$. All the key levers of the keys in C bank are thus fulcrumed upon the rod $K^9$.

Journaled in the sides $L^1$, $L^2$ to the rear of the rods $K^3$, $K^6$ and $K^9$, is the rock shaft $K^{10}$, to which are fastened the crank arms $K^{11}$, extending along the sides $L^1$, $L^2$ and connected by the rod $K^{12}$ which is directly below and contacts all of the key levers. Beneath this rod $K^{12}$ and adapted to be moved by it is the crank arm $B^{20'}$ upon the rock shaft $B^{20}$ adapted to control the operation of the selector B.

From the description of the foregoing details, it will be obvious that the depression of any one of the key levers when its key is struck, will cause the depression of the bar $K^{12}$ and consequent rocking of the rock shaft $B^{20}$ through the crank arm $B^{20'}$, thus operating the selector B.

The rock shaft $K^{10}$ projects through the side $L^2$ at the left of the casing L and is provided upon its end with a crank arm $K^{13}$ which is connected by a link $K^{14}$ with a crank arm $K^{15}$ upon the rock shaft $K^{16}$ which is journaled in the side $L^2$ and a bracket $K^{17}$ within the casing L attached to its back $L^4$. This rock shaft $K^{16}$ has a crank arm $K^{18}$ which is connected by a link $K^{19}$ with the crank arm $C^9$ for operating the gates $D^4$, $D^4$ of the trough D and the idler forwarding roller $C^7$.

It will be seen that whenever the selector B is operated by the mechanism just described, the rock shaft $K^{10}$ will be rocked and will impart movement through the mechanism above described to the crank arm $C^9$ and thus cause the gates $D^4$, $D^4$ to open and the idler $C^7$ to co-act with the forwarding roller $C^6$ to forward a piece of mail matter from the trough C to the trough D.

Suitably mounted in the sides $L^1$, $L^2$ of the casing L above the rods $K^3$, $K^6$ and $K^9$ are the rods $K^{20}$, $K^{21}$ and $K^{22}$. Fulcrumed upon the rod $K^{20}$ are the levers $K^{23}$, $K^{23}$ connected at their ends by the rod $K^{24}$ which extends across the casing L above the key levers. In like manner levers $K^{25}$, $K^{25}$ are fulcrumed upon rod $K^{22}$ and connected by rod $K^{26}$.

Key lever $K^2$ is provided with an upstanding hook $K^{27}$ which engages the rod $K^{24}$. The key levers of all of the keys in A bank are thus provided with hooks engaging the rod $K^{24}$.

Key lever $K^8$ is provided with a hook $K^{28}$ which engages the rod $K^{26}$. The key levers of all of the keys in C banks are thus provided with hooks engaging the rod $K^{26}$.

Extending across the casing L and supported by the sides $L^1$ and $L^2$ above the rods $K^{24}$ and $K^{26}$ are the plates $K^{29}$ and $K^{30}$ in which is mounted the rod $K^{31}$ disposed parallel to the sides $L^1$ and $L^2$ and at about the middle of the plates $K^{29}$, $K^{30}$. Mounted upon this rod $K^{31}$ are the rock shafts $K^{32}$, $K^{33}$.

The rod $K^{24}$ is provided with an arm $K^{34}$ which is connected by a link $K^{35}$ with a crank arm $K^{36}$ upon the rock shaft $K^{32}$. This rock shaft $K^{32}$ has a crank arm $K^{37}$ which is connected by a link $K^{38}$ with the crank $D^{17}$ for operating the trough D to move it into relation with the trough $E^2$ upon the channel $F^2$.

The rod $K^{26}$ is provided with an arm $K^{39}$ which is connected by a link $K^{40}$ with a crank arm $K^{41}$ upon the rock shaft $K^{33}$. This rock shaft $K^{33}$ has a crank arm $K^{42}$ which is connected by a link $K^{43}$ with the crank arm $D^{18}$ for operating the trough D to move it into relation with the trough E upon the channel F.

Thus it will be seen that when any one of the keys in A bank is struck, through the mechanism just described the trough D will be moved into position to direct mail to channel $F^2$. When any one of the keys in C bank is struck, the trough D will be moved into position to direct mail to channel F.

Since the keys in B bank control the deflectors G on channel $F^1$, and the normal position of the trough D serves to direct mail to channel $F^1$, it is not necessary to effect any operation of the trough D when any one of the keys in B bank is used.

Fulcrumed upon the rod $K^{21}$ are the levers $K^{44}$, $K^{44}$ connected by the rod $K^{45}$ which is situated between the rods $K^{24}$ and $K^{26}$ and directly above all the key levers. Each of the key levers, except those of the repeat keys, is provided with a pivoted hook $K^{46}$ which is adapted to be held in engagement with the rod $K^{45}$ by the spring $K^{47}$. This hook $K^{46}$ has an upstanding portion $K^{48}$ having a curved cam face $K^{49}$ adapted to co-act with a fixed rod $K^{50}$ carried by the sides $L^1$, $L^2$ above the rod $K^{45}$. This rod $K^{45}$ has an arm $K^{51}$ which is connected by a link $K^{52}$ with a crank arm $K^{53}$ upon the rock shaft $S^5$ for operating the means for unlocking the operating mechanism of the deflectors G.

Since each of the key levers for operating the deflectors G has means above described for rocking shaft $S^5$, it will be seen that whenever any one of the keys is struck any one of the deflectors G which has been previously moved into delivery position and locked therein, will be unlocked and permitted to resume its normal position.

Each one of the key levers for operating the deflectors G is provided upon its upper edge at a point immediately behind the front $L^3$ of the casing L, with two hooks $L^5$ and $L^6$. Above these hooks the casing L is provided with a slidable plate $L^7$ carried in guides $L^8$, $L^8$ attached to the sides $L^1$, $L^2$. Pivotally connected with this plate $L^7$ are crank arms $L^9$, $L^9$ upon a rock shaft $L^{10}$ journaled in the sides $L^1$, $L^2$, which is provided with a crank arm $L^{11}$ to the end of which is attached the shift key $L^{12}$ upon the key board K.

The plate $L^7$ is provided with a double series of holes $L^{13}$ and $L^{14}$ and for each key lever there are provided two links $L^{15}$, $L^{16}$, links $L^{15}$ being carried by the plate $L^7$ in the holes $L^{13}$, and links $L^{16}$ in holes $L^{14}$. The parts are so related that when the plate $L^7$ is in normal position it holds the links $L^{15}$ so that the hooks $L^{15'}$ upon their lower ends are engaged by the hooks $L^5$ upon the key levers, and at the same time the links $L^{16}$ are so held that the hooks $L^{16'}$ upon their lower ends are out of engagement with the hooks $L^6$ upon the key levers.

When the shift key $L^{12}$ is depressed, the plate $L^7$ is moved forward and the hooks $L^{15'}$ are disengaged from the hooks $L^5$, while the hooks $L^{16'}$ are engaged with the hooks $L^6$.

Suitably journaled in the plates $K^{29}$ and $K^{30}$ are three series of hollow rock shafts $L^{17}$, $L^{18}$ and $L^{19}$, upon the front ends of which are the crank arms $L^{20}$, $L^{21}$ and $L^{22}$ respectively. The links $L^{15}$ adapted to engage the hooks $L^5$ of the key levers of the keys in A bank are connected wth the crank arms $L^{20}$. The links $L^{15}$ adapted to engage the hooks $L^5$ of the key levers of the keys in B bank are connected with the crank arms $L^{21}$, and the remaining links $L^{15}$ are connected with crank arms $L^{22}$.

Upon the rear ends of the shafts $L^{17}$, $L^{18}$ and $L^{19}$ there are provided crank arms $L^{23}$, $L^{24}$, and $L^{25}$ respectively. The crank arms $L^{23}$ are connected by means of pull wires $L^{26}$ with the crank arms $G^{17}$ of the deflectors G upon the channel $F^2$. The crank arms $L^{24}$ are connected by means of pull wires $L^{27}$ with the crank arms $G^{17}$ of the deflectors G upon the channel $F^1$. The crank arms $L^{25}$ are connected by means of pull wires $L^{28}$ with the crank arms $G^{17}$ of the deflectors G upon the channel F.

Journaled inside the hollow rock shafts $L^{17}$, $L^{18}$ and $L^{19}$ respectively are rock shafts $L^{29}$, $L^{30}$ and $L^{31}$ upon the front ends of which are the crank arms $L^{32}$, $L^{33}$ and $L^{34}$, respectively. The links $L^{16}$ adapted to engage the hooks $L^6$ of the key levers of the keys in A bank are connected with the crank arms $L^{32}$. The links $L^{16}$ adapted to engage the hooks $L^6$ of the key levers of the keys in B bank are connected with the crank arms $L^{33}$, and the remaining links $L^{16}$ are connected with crank arms $L^{34}$.

Upon the rear ends of the rock shafts $L^{29}$, $L^{30}$ and $L^{31}$ there are provided crank arms $L^{35}$, $L^{36}$ and $L^{37}$ respectively. The crank arms $L^{35}$ are connected by means of pull wires $L^{38}$ with the crank arms $G^{18}$ of the deflectors G upon the channel $F^2$. The crank arms $L^{36}$ are connected by means of pull wires $L^{39}$ with the crank arms $G^{18}$ of the deflectors G upon the channel $F^1$. The crank arms $L^{37}$ are connected by means of pull wires $L^{40}$ with the crank arms $G^{18}$ of the deflectors G upon the channel F.

It will be seen that each key is adapted to control a deflector G and turn it to direct mail into either receptacle H with which it is associated. If the parts are in normal position, the key will operate to move its deflector G to direct mail into the receptacle H toward the rear side of the channel. But if the shift key is depressed, the deflector operating key when struck will operate to move the deflector G to direct mail into the receptacle H toward the front side of the channel.

The repeat key which is placed in each bank of the key board K is for use when it is desired to send successively two or more pieces of mail matter to the same receptacle H. The parts of the device having been adjusted for delivery of the first piece to the particular receptacle, it is only required to operate the selector B, trough D (if for channel F or F²), and gates D⁴, D⁴ and idler C⁷, to forward the successive pieces to the same destination. Thus the repeat key L⁴¹ in A bank is adapted to depress bar K¹² and thus operate the selector B and gates D⁴, D⁴ and roller C⁷, and it also has a hook K²⁷ to actuate the trough D to direct the piece of mail to channel F², since it is to send the piece of mail matter to a receptacle H controlled by a key upon A bank. The repeat key L⁴² in B bank has only to operate the selector B, gates D⁴, D⁴ and roller C⁷. The repeat key L⁴³ in C bank is similar to key L⁴¹ except that it is adapted to operate the trough D to direct mail to channel F.

The distributor operates as follows:

Unassorted mail having been "faced" is placed in the receptacle A and power is applied to the device through the shaft S. The operator depresses any one of the keys on the keyboard K which causes the initial selector to draw a single letter from the pack in the receptacle A. When the key is released, the secondary selector forwards the letter to the trough C where it comes to rest against the roller C⁶ when its front end rests against the closed gates D⁴. The operator determines the box H into which the letter should be delivered after reading the address. He depresses the key which adjusts the individual deflector G which will deliver the letter into the desired box, and the depression of this key also adjusts the master deflector D in relation to the proper mail forwarding means to convey the letter to the proper deflector G. The depression of the key also causes the roller C⁷ to press the letter against the roller C⁶ and opens the gates D⁴. The letter is forwarded by the rollers C⁶, C⁷ and passing through the master deflector D proceeds on one of the ways F, F¹ or F², being forwarded by the rollers between the troughs E, and is forwarded through the deflectors G until it reaches the deflector G which has been adjusted, by which it is delivered into the receptacle H associated therewith.

The depression and release of the key which has forwarded the letter, as just described, also effects the delivery of the next letter to the trough C ready for forwarding to its appointed box H.

Having described my invention, what I claim is:

1. In a mail distributor, the combination of a receptacle adapted to receive unassorted mail; a rotatable cam adapted to remove a single piece of mail from said receptacle; a second rotatable cam adapted to forward the piece of mail so removed; means adapted to rotate said cams alternately; a key adapted to be depressed; and means operated by the depression of said key adapted to control said rotating means.

2. In a mail distributor, the combination of a receptacle adapted to receive unassorted mail; a rotatable cam adapted to remove a single piece of mail from said receptacle; a second rotatable cam adapted to forward the piece of mail so removed; a power shaft; a pinion adapted to be rotated by said shaft; a yoke adapted to be reciprocated by said pinion; two racks adapted to be reciprocated by the reciprocation of said yoke; a gear-and-ratchet connection between each of said racks and the corresponding one of said cams adapted to rotate said cam when said rack is reciprocated; a key adapted to be depressed; and means operated by the depression of said key adapted to cause the pinion to reciprocate the yoke.

3. In a mail distributor, the combination of a receptacle adapted to receive unassorted mail; a trough adapted to receive a single piece of mail and display the address thereon; a rotatable cam adapted to remove a single piece of mail from said receptacle; a second rotatable cam adapted to forward said piece of mail to said trough; and means adapted to alternately actuate said cams.

4. In a mail distributor, the combination of an unassorted mail receptacle; a plurality of assorted mail receptacles arranged in series; independent mail forwarding means associated with each series; a trough adapted to receive a piece of mail from said unassorted mail receptacle and deliver same to any one of said mail forwarding means and a plurality of keys arranged in series, the keys in each series being adapted to adjust said trough to deliver a piece of mail to the corresponding one of said forwarding means.

5. In a mail distributor, the combination of an unassorted mail receptacle; a plurality of assorted mail receptacles arranged in series; independent mail forwarding means associated with each series; a swingable trough adapted to receive a piece of mail from said unassorted mail receptacle and deliver same to any one of said mail forwarding means; a plurality of keys arranged in series corresponding with the receptacle series, each key in each series being adapted to adjust said trough to deliver a piece of mail to the mail forwarding means associated with the series of receptacles corresponding with its key series.

6. In a mail distributor, the combination of a receptacle adapted to receive unassorted mail; a plurality of receptacles adapted to receive assorted mail, said receptacles being arranged in a plurality of series and the receptacles in each series being arranged in pairs; a deflector associated with each pair of receptacles adapted to deliver a piece of mail into either receptacle; means associated with each series of receptacles adapted to forward a piece of mail to each deflector; and means adapted to receive a single piece of mail from said unassorted mail receptacle and deliver same to any one of said mail forwarding means.

7. In a mail distributor, the combination of a plurality of receptacles adapted to receive sorted mail, said receptacles being arranged in a plurality of series and the receptacles in each series being arranged in pairs; a deflector associated with each pair adapted to deliver mail to either receptacle; a series of forwarding rollers associated with each series of assorted mail receptacles; a trough adapted to deliver mail to any one of said series of rollers; and a plurality of keys arranged in series corresponding with the receptacle series, each key in each series being adapted to adjust said trough to deliver a piece of mail to the series of rollers associated with the receptacle series corresponding with its key series, and also adapted to adjust a deflector associated with one pair of assorted mail receptacles in its corresponding receptacle series to deliver the piece of mail into one of the associated receptacles.

8. In a mail distributor, the combination of a plurality of receptacles adapted to receive sorted mail, said receptacles being arranged in a plurality of series and the receptacles in each series being arranged in pairs; a deflector associated with each pair adapted to deliver mail to either receptacle; a series of forwarding rollers associated with each series of assorted mail receptacles; a trough adapted to deliver mail to any one of said series of rollers; an unassorted mail receptacle; two rotatable cams, one of which is adapted to remove a single piece of mail from said unassorted mail receptacle, and the other adapted to forward said piece; and a pair of forwarding rollers adapted to deliver said forwarded piece to said trough.

9. In a mail distributor, the combination of a plurality of receptacles adapted to receive sorted mail, said receptacles being arranged in a plurality of series and the receptacles in each series being arranged in pairs; a deflector associated with each pair adapted to deliver mail to either receptacle; a series of forwarding rollers associated with each series of assorted mail receptacles; a trough adapted to deliver mail to any one of said series of rollers; an unassorted mail receptacle; two rotatable cams, one of which is adapted to remove a single piece of mail from said unassorted mail receptacle, and the other adapted to forward said piece; two forwarding rollers adapted to deliver said forwarded piece to said trough; and means adapted to control the operation of said cams, trough and mail delivery receptacles.

10. In a mail distributor, the combination of an unassorted mail receptacle; two cams adapted to remove a single piece of mail from said receptacle; a power shaft adapted to alternately actuate said cams; a plurality of assorted mail receptacles arranged in a plurality of series, the receptacles in each series being arranged in pairs; a deflector associated with each of said pairs and adapted to deflect mail delivered to it into either receptacle; a master deflector common to all the series of receptacles and adapted to deflect mail to any of the deflectors; a plurality of keys arranged in a plurality of banks; and a key lever associated with each key adapted to control the actuation of the cams by the power shaft, and secure the proper adjustment of the master deflector and one of the individual deflectors.

11. In a mail distributor, the combination of a plurality of assorted mail receptacles arranged in pairs; a swingable trough associated with each pair adapted to deliver mail into either receptacle of the pair; means adapted to swing each trough into relation with either of its associated receptacles; means adapted to lock said troughs in adjusted position; means adapted to unlock said locking means; and means adapted to return said troughs to normal position.

12. In a mail distributor, the combination of a plurality of assorted mail receptacles arranged in pairs; a swingable trough associated with each pair adapted to deliver mail into either receptacle of the pair; means adapted to swing each trough into relation with either of its associated receptacles; means adapted to lock said troughs in adjusted position; means adapted to unlock said locking means; means adapted to return said troughs to normal position; and means adapted to operate said swinging means, locking means, unlocking means and return means.

13. In a mail distributor, the combination of a plurality of assorted mail receptacles arranged in pairs; a swingable trough associated with each pair adapted to deliver mail into either receptacle of the pair; means adapted to swing each trough into relation with either of its associated receptacles; means adapted to lock said troughs in adjusted position; means adapted to unlock said locking means; means adapted to return said troughs to normal position; and a depressible key corresponding to each trough adapted at each depression to operate the swinging means and locking means of its trough and the unlocking means of all the troughs and render operative the return means of any trough in adjusted position.

14. In a mail distributor, the combination of a plurality of assorted mail receptacles arranged in sets, the receptacles of each set being arranged in pairs; a swingable trough associated with each pair of receptacles and adapted to deflect mail into either receptacle of the pair; a plurality of keys arranged in sets corresponding with the sets of receptacles; a key lever connected with each key adapted to swing one of said troughs; and a shift key adapted to determine the direction of movement of each trough by each key lever.

15. In a mail distributor, the combination of a key; a key lever adapted to be depressed when said key is struck; two rock shafts; a crank arm mounted on each shaft; two links adapted to alternatively connect said key lever with said arms to rock said shafts; two assorted mail receptacles; a swingable trough adapted to deliver mail to either receptacle; and means adapted to swing the trough in relation to one receptacle when one rock shaft is rocked, and into relation with the other receptacle when the other rock shaft is rocked.

16. In a mail distributor, the combination of a plurality of keys arranged in sets; a plurality of key levers, each key lever being adapted to be depressed when its associated key is struck; two rock shafts located above each of said key levers; the pairs of shafts being arranged in sets corresponding with the sets of keys; means actuated by the depression of the key levers adapted to alternatively rock said rock shafts; a plurality of swingable troughs arranged in sets corresponding with the sets of keys and rock shafts; and means connecting each pair of rock shafts with one of said troughs adapted to swing said trough by the rocking of said shafts.

17. In a mail distributor, the combination of a plurality of keys; a plurality of key levers each of which is adapted to be depressed when its associated key is struck and provided with two hooks; two rock shafts located above each key lever; a crank arm on each of said shafts; a link on each crank arm provided with a hook; a slidable plate provided with holes through which said links pass, said plate being adapted when in normal position to hold the hooks of one set of links in engagement with one set of hooks upon said key levers, and when moved out of normal position to hold the hooks of the other set of links in engagement with the other set of hooks upon said key levers; and means for moving said plate.

In testimony whereof I affix my signature.

GEORGE M. KITZMILLER.